US 12,436,274 B2

(12) United States Patent
Cao

(10) Patent No.: US 12,436,274 B2
(45) Date of Patent: Oct. 7, 2025

(54) SYSTEMS AND METHODS FOR RADAR PERCEPTION

(71) Applicant: FORD GLOBAL TECHNOLOGIES, LLC, Dearborn, MI (US)

(72) Inventor: Ning Cao, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 18/051,582

(22) Filed: Nov. 1, 2022

(65) Prior Publication Data

US 2024/0142614 A1    May 2, 2024

(51) Int. Cl.
*G01S 13/931*    (2020.01)
*G01S 13/58*    (2006.01)

(52) U.S. Cl.
CPC ............ *G01S 13/931* (2013.01); *G01S 13/58* (2013.01)

(58) Field of Classification Search
CPC .................. G01S 13/931; G01S 13/58; G01S 2013/9316; G01S 2013/932; G01S 13/426; G01S 13/583; G01S 2013/93271; G01S 13/87; G01S 13/89; G01S 13/42
See application file for complete search history.

(56) References Cited

U.S. PATENT DOCUMENTS

| | | | | |
|---|---|---|---|---|
| 6,628,227 | B1 * | 9/2003 | Rao ........................ | G01S 15/876 342/70 |
| 7,071,867 | B2 | 7/2006 | Wittenberg et al. | |
| 9,423,498 | B1 * | 8/2016 | Brown ................... | G01S 13/867 |
| 9,810,774 | B2 * | 11/2017 | Wittenberg ......... | G01S 13/4463 |
| 10,404,261 | B1 * | 9/2019 | Josefsberg ............ | G01S 13/931 |
| 11,255,957 | B2 * | 2/2022 | Oh ......................... | G01S 13/42 |
| 2009/0222172 | A1 * | 9/2009 | Yopp ..................... | G01S 13/931 701/45 |

(Continued)

FOREIGN PATENT DOCUMENTS

WO    2018142395 A1    8/2018

OTHER PUBLICATIONS

Leonard "Vehicle Tracking Using Ultra-Wideband Radar", Thesis presented to Georgia Institute of Technology, 2016 (71 pages).

(Continued)

*Primary Examiner* — Vladimir Magloire
*Assistant Examiner* — Kimberly Jenkins
(74) *Attorney, Agent, or Firm* — Frank A. MacKenzie; Brooks Kushman, P.C.

(57) ABSTRACT

This document discloses system, method, and computer program product embodiments for operating a radar system. For example, the method includes: obtaining radar scan data for a first scan performed by a first radar device and radar scan data for a second scan performed by the first radar device or a second device; identifying a detection pair comprising a first detection in the radar scan data for the first scan and a second detection in the radar scan data for the second scan; obtaining a 2D initial particle velocity using positions of first and second detections of the detection pair; using the 2D initial particle velocity to obtain a projected range rate for the second detection of the detection pair; and creating a particle when the projected range rate matches a range rate associated with the second detection of the detection pair by a certain amount.

18 Claims, 12 Drawing Sheets

(56) References Cited

U.S. PATENT DOCUMENTS

| | | | | |
|---|---|---|---|---|
| 2015/0198711 A1* | 7/2015 | Zeng | ............ | G01S 13/9029 |
| | | | | 342/59 |
| 2017/0192091 A1* | 7/2017 | Felix | ............ | G01S 13/42 |
| 2018/0113209 A1* | 4/2018 | Campbell | ............ | G01S 13/86 |
| 2022/0063720 A1* | 3/2022 | Oh | ............ | B60D 1/245 |
| 2023/0161026 A1* | 5/2023 | Grebner | ............ | G01S 7/354 |
| | | | | 342/113 |
| 2024/0192369 A1* | 6/2024 | Chauhan | ............ | G01S 17/931 |

OTHER PUBLICATIONS

International Search Report of PCT/US2022/080804 mailed Jun. 8, 2023, 4 pages.

Written Opinion of PCT/US2022/080804 mailed Jun. 8, 2023, 6 pages.

* cited by examiner

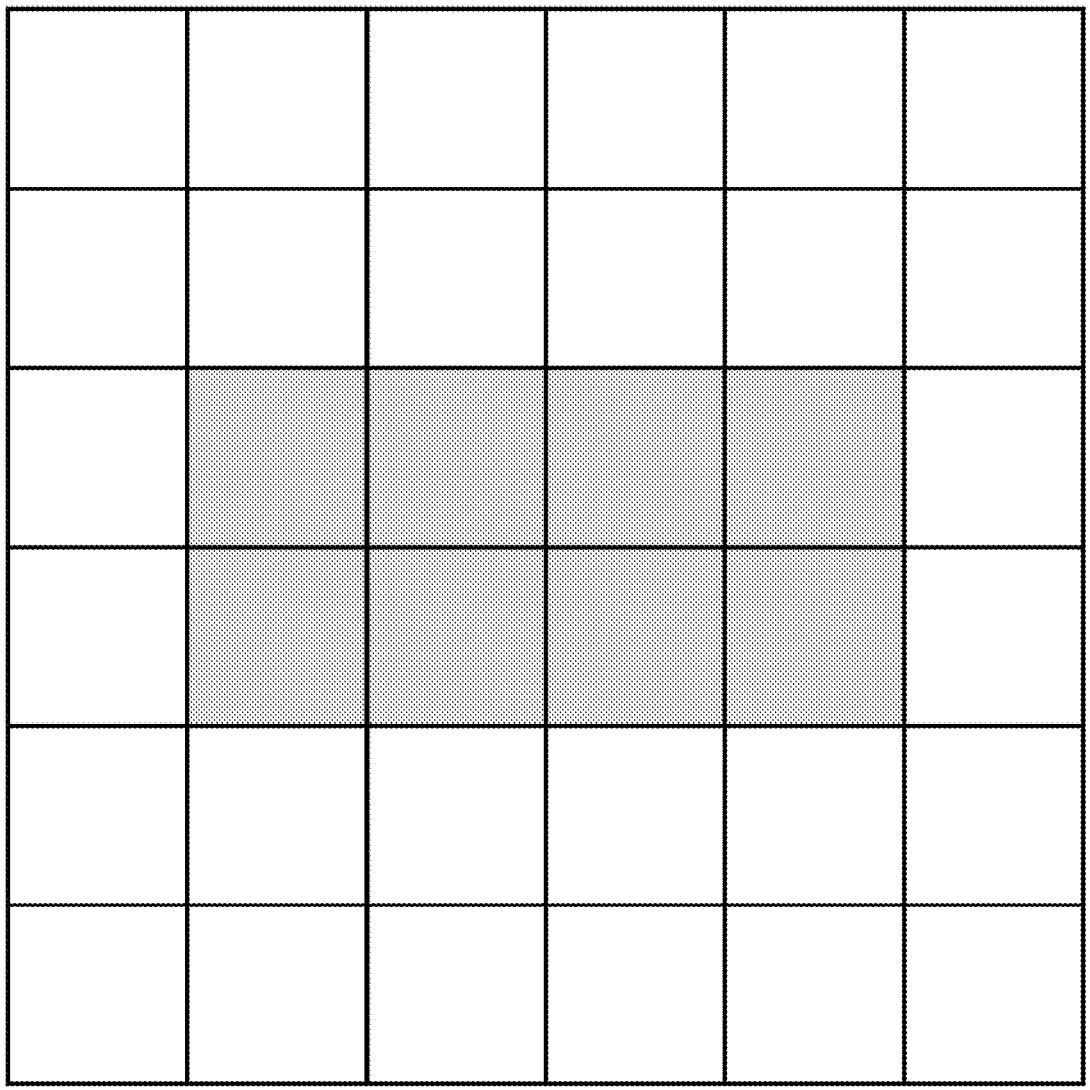

Go To FIG. 7B

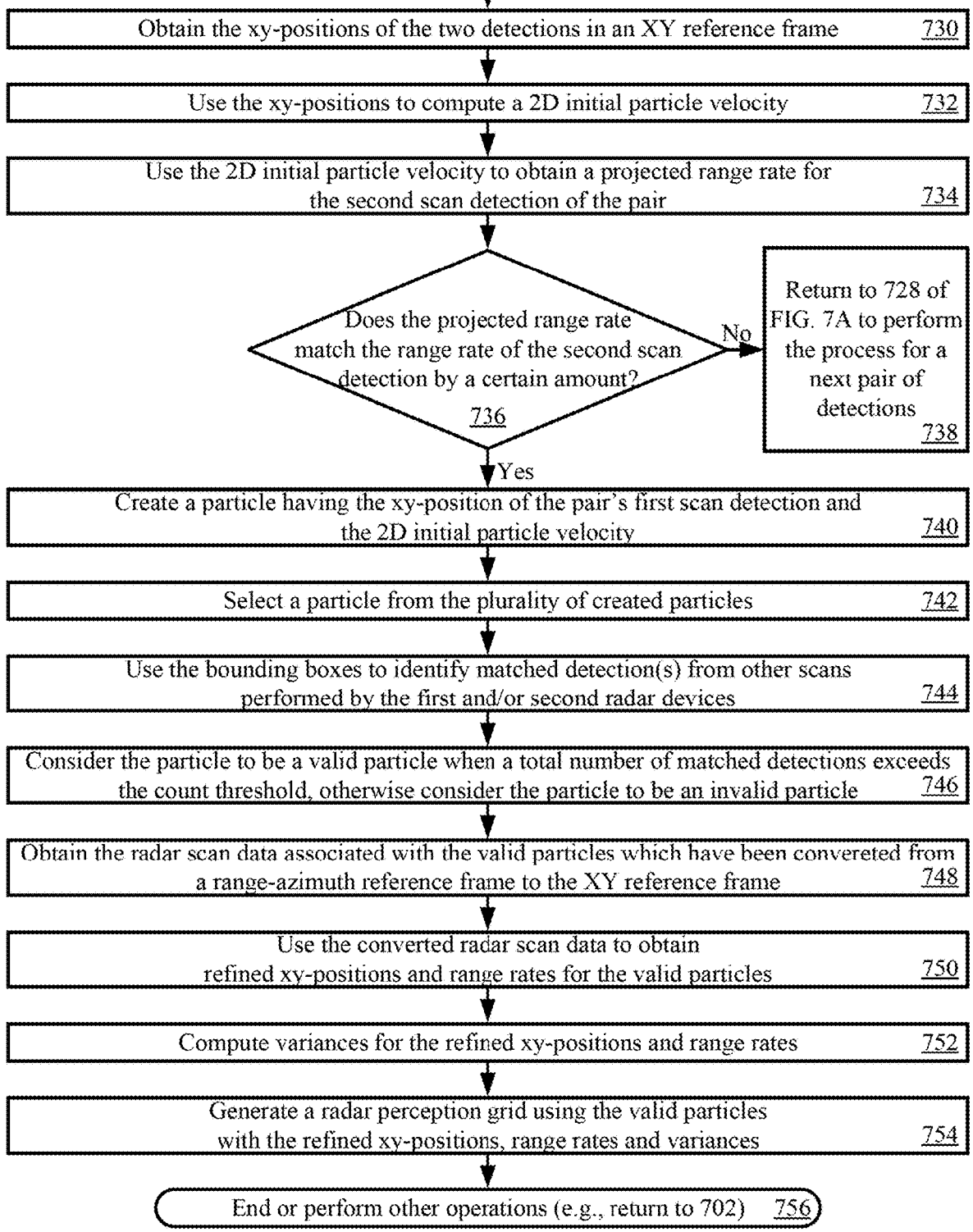

SYSTEMS AND METHODS FOR RADAR PERCEPTION

BACKGROUND

Radar systems are often used for detecting the presence, direction, distance and speed of objects. The objects can include vehicles, ships, aircrafts, pedestrians, animals, trees and/or buildings. During operations, a radar system emits a signal that is reflected off of an object back towards the radar systems. The reflected signal is received by the radar system. The received signal provides information about the object's location and speed. For example, if an object is moving either toward or away from the radar system, the received signal will have a slightly different frequency than the frequency of the emitted signal due to the Doppler effect.

SUMMARY

The present disclosure concerns implementing systems and methods for operating a radar system and/or a vehicle. The methods comprise performing the following operations by a processor: obtaining radar scan data for a first scan performed by a first radar device of the radar system and radar scan data for a second scan performed by the first radar device or a second device of the radar system; identifying a detection pair comprising a first detection in the radar scan data for the first scan and a second detection in the radar scan data for the second scan; obtaining a 2D initial particle velocity using positions of the first and second detections of the detection pair; using the 2D initial particle velocity to obtain a projected range rate for the second detection of the detection pair; and creating a particle when the projected range rate matches a range rate associated with the second detection of the detection pair by a certain amount. The particle is assigned the 2D initial particle velocity and the position of the first detection of the detection pair.

The implementing systems can comprise: a processor; and a non-transitory computer-readable storage medium comprising programming instructions that are configured to cause the processor to implement a method for operating a radar system and/or a vehicle. The above-described methods can also be implemented by a computer program product comprising memory and programming instructions that are configured to cause a processor to perform operations.

BRIEF DESCRIPTION OF THE DRAWINGS

The accompanying drawings are incorporated into this document and form a part of the specification.

FIG. 6 provides an illustration of a radar perception grid.

FIGS. 7A-7B (collectively referred to as "FIG. 7") provide a flow diagram of an illustration method for generating a radar perception grid.

In the drawings, like reference numbers generally indicate identical or similar elements. Additionally, generally, the left-most digit(s) of a reference number identifies the drawing in which the reference number first appears.

DETAILED DESCRIPTION

Figure 1:
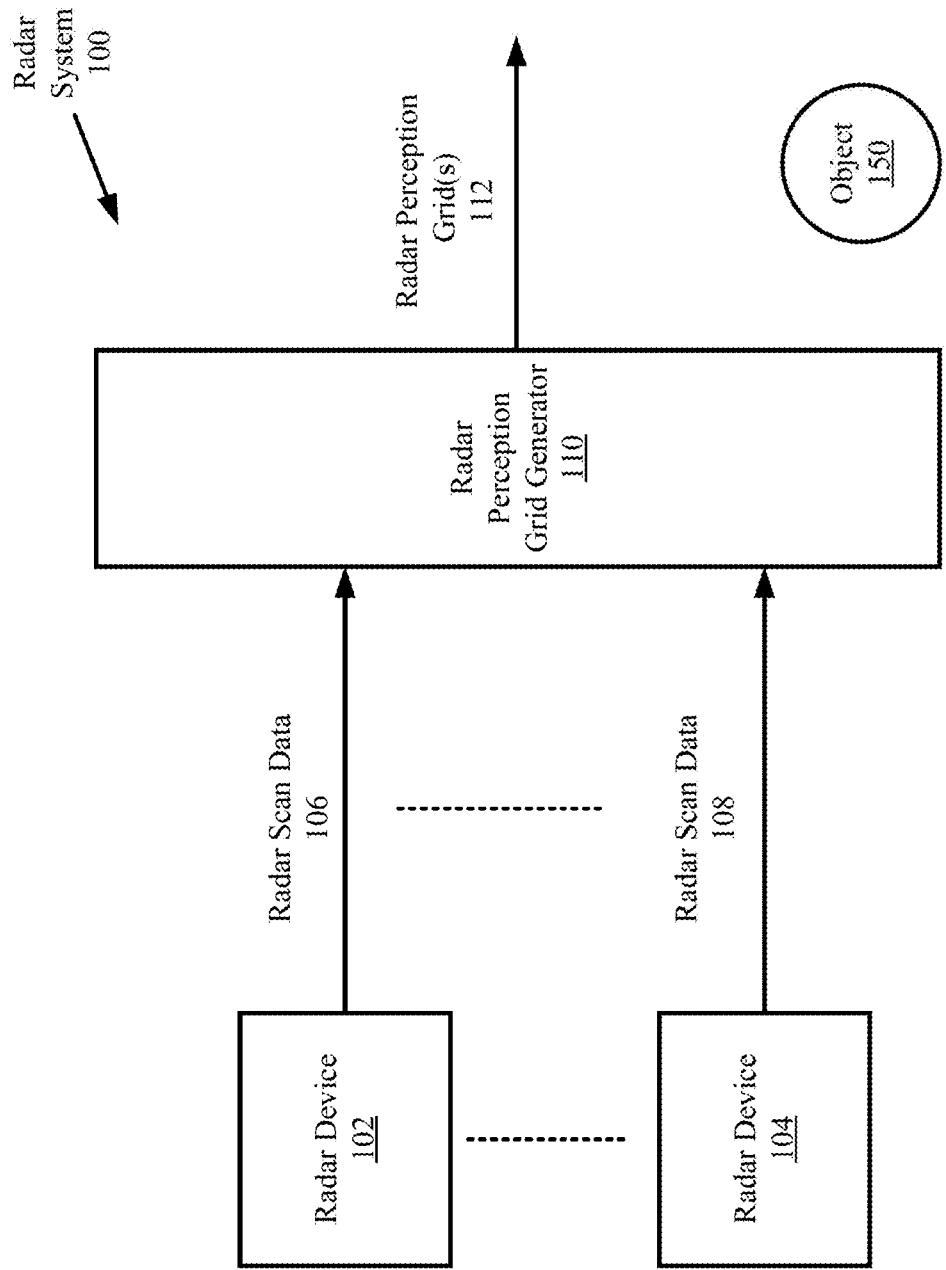
FIG. 1 shows an illustrative radar system.

Conventional radar systems that implement radar perception algorithms are computationally intensive. During operation, a radar device emits a signal that is reflected off of an object back towards the radar device. The reflected signal is received by the radar device. The received signal provides information about the object's location and speed. For example, if the object is moving either toward or away from the radar system, the received signal will have a slightly different frequency than the frequency of the emitted signal due to the Doppler effect. The radar device processes the received signal and produces measurements. These measurements are referred to as detections. The detections are used to generate tracks for detected objects (including track initialization, track prediction, detection-track association, and track update procedures). The tracks may then be used for risk assessment in an autonomous vehicle application. The present solution is not a track-based solution, but rather a perception grid-based solution which has been found to have improved efficiency and robustness.

The present document describes system, apparatus, device, method and/or computer program product embodiments, and/or combinations and sub-combinations of any of the above, for generating a radar perception grid in accordance with a novel process. The methods generally involve: filtering radar scan data to remove detections outside a reachable region, remove detections that are associated with false alarms, or remove detections considered low radar cross-section (RCS) detections; and enabling particle generation operations of the processor when a number of scans performed by the radar system exceeds a threshold.

The particle generation operations may comprise: obtaining radar scan data for a first scan performed by a first radar device of the radar system and radar scan data for a second scan performed by the first radar device or a second device of the radar system; and identifying a detection pair comprising a first detection in the radar scan data for the first scan and a second detection in the radar scan data for the second scan. The detection pair is identified using a search window that is defined by coordinates expressed in a range-azimuth reference frame. The second detection of the pair comprises a range value falling between minimum and maximum ranges of the search window and an azimuth value falling between minimum and maximum azimuths of the search window.

The particle generation operations also may comprise: obtaining a 2D initial particle velocity using positions of the first and second detections of the detection pair. The positions of the first and second detections of the detection pair are defined in relation to an XY reference frame. The 2D initial particle velocity is used to obtain a projected range rate for the second detection of the detection pair. A particle is created when the projected range rate matches a range rate associated with the second detection of the detection pair by a certain amount. The particle is assigned the 2D initial particle velocity as a range rate and the position of the first detection of the detection pair.

The particle is considered a valid particle when a total number of matched detections exceeds a count threshold. Each matched detection is associated with another scan performed by the radar system and has a position located inside a bounding box associated with the first detection of the detection pair. The bounding box is defined by coordinates expressed in a range-azimuth reference frame. The range and azimuth variances associated with the first detection of the detection pair are used to obtain the coordinates of the bounding box. Using the matched detections, the position and range rate of the particle may be refined using a least square algorithm.

The particles are then used to create a radar perception grid. The radar perception grid may be used to control operations of an autonomous vehicle. For example, the radar perception grid can be used to detect an object in proximity to the autonomous vehicle and generate a possible trajectory for the detected object. The possible object trajectory can then be used to generate or modify a vehicle trajectory.

The above-described method of the present solution has many novel features. One novel feature is that the particles are generated in a range and azimuth framework instead of an XY framework, which makes the present solution efficient and fast. Another novel feature is that the range and azimuth variances are used to create a corresponding bounding box for each detection. The bounding box is used to find detections associated with the particles. This strategy can run in a parallel manner and is computationally fast. Yet another novel feature is the implementation of a least-square regression-based particle refinement procedure to refine the particle estimation. So, all radar detection information is used which provides more robust and accurate results as compared to conventional solutions.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

Definitions for additional terms that are relevant to this document are included at the end of this Detailed Description.

The following discussion describes the present solution in the context of an autonomous vehicle ("AV"). However, the present solution is not limited to AV applications. The present solution may be used in other applications such as robotic applications, radar system applications, metric applications, and/or system performance applications.

Illustrative Radar Systems

The present solution concerns a radar system for detecting the presence, direction, distance and speed of objects, which may include moving actors, stationary objects, or both. The objects can include vehicles, ships, aircrafts, pedestrians, animals, trees and/or buildings. An illustration of a radar system 100 is provided in FIG. 1. As shown in FIG. 1, the radar system 100 comprises radar devices 102, 104. Although two radar devices are shown in FIG. 1, the present solution is not limited in this regard. The radar system can include any number of radar devices selected in accordance with a given application. An illustrative architecture for a radar device will be discussed below in relation to FIG. 2. The radar system 100 also comprises a radar perception grid generator 110. The radar perception grid generator 110 can include, but is not limited to, a processor (for example, processor 1104 of FIG. 11) and/or a computing device (for example, computing device 822 of FIG. 8, 920 of FIG. 9, and/or 1100 of FIG. 11).

During operation, each radar device 102, 104 emits a signal that is reflected off of an object 150 back towards the radar device. The reflected signal is received by the radar device 102, 104. The received signal provides information about the object's location and speed. For example, if the object 150 is moving either toward or away from the radar system 100, the received signal will have a slightly different frequency than the frequency of the emitted signal due to the Doppler effect. The radar device processes the received signal and generates radar scan data. The radar scan data includes detection information. The detection information includes, but is not limited to, the following information for each detection: a time t, a range r, range rate v, an azimuth value θ, and corresponding standard deviations $\sigma_r$, $\sigma_\theta$, $\sigma_v$. $\sigma_r$ represents a standard deviation for range. $\sigma_\theta$ represents a standard deviation for azimuth. a represents a standard deviation for range rate. The range-rate value indicates a rate that the object 150 moves toward or away from the radar system 100. For example, a negative range-rate value indicates that the object 150 is moving away from the radar system 100 at a certain velocity, while a positive range-rate value indicates that the object 150 is moving towards the radar system 100 at a certain velocity. The present solution is not limited to the particulars of this example.

Radar scan data 106, 108 is communicated from each radar device to the radar perception grid generator 110. At the radar perception grid generator 110, the radar scan data 106, 108 is used to generate a radar perception grid 112 associated with the object 150. The manner in which the radar perception grid 112 is generated will become evident as the discussion progresses.

Figure 2:
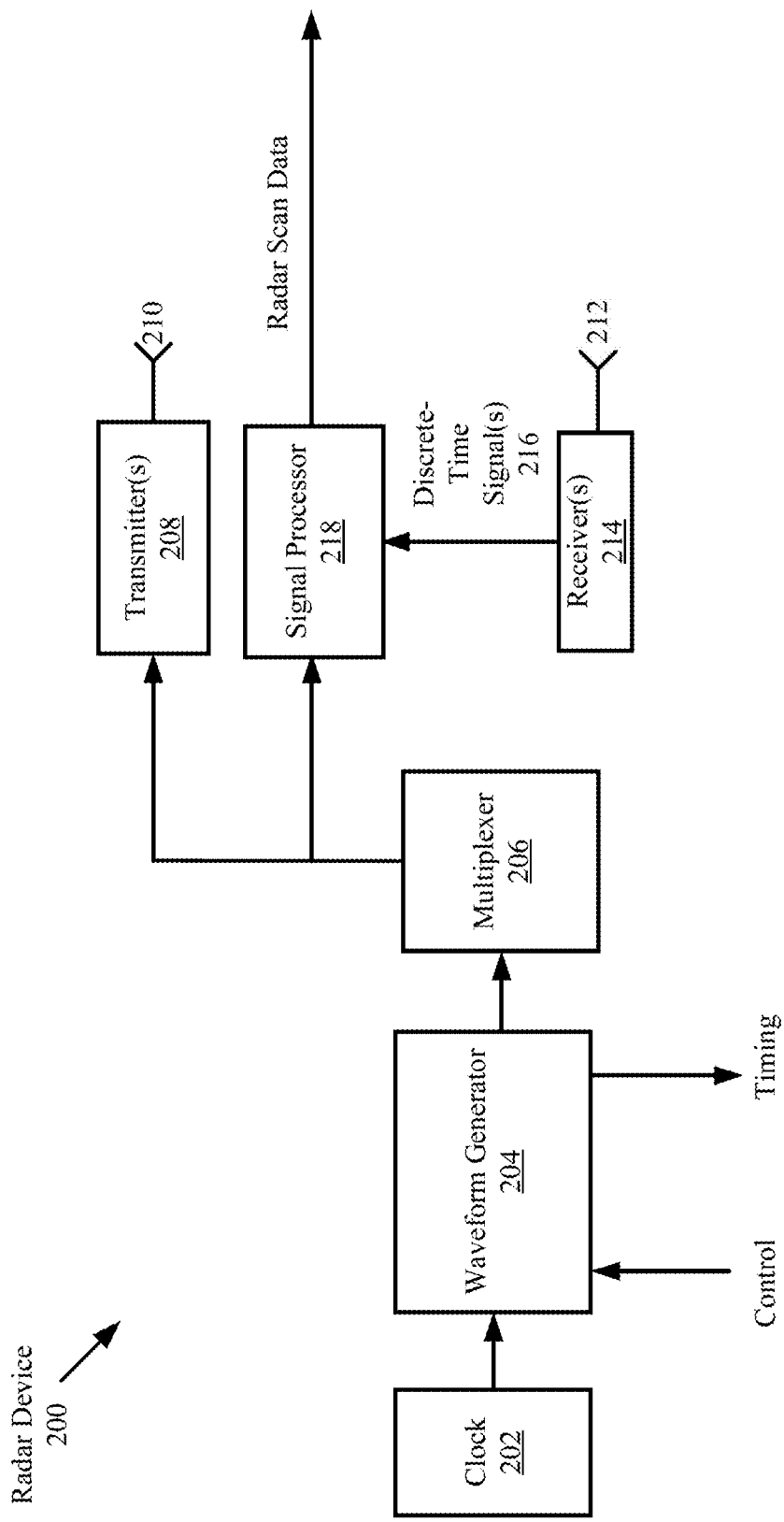
FIG. 2 provides a more detailed illustration of a radar device.

Referring now to FIG. 2, there is provided an illustration of an illustrative radar device 200. Radar devices 102, 104 of FIG. 1 are the same as or similar to radar device 200. Thus, the following discussion of radar device 200 is sufficient for understanding radar devices 102, 104.

As shown in FIG. 2, the radar device 200 comprises a clock 202 and a waveform generator 204. The waveform generator 204 is capable of producing a suitable waveform for range determination. The waveform can include, but is not limited to, a continuous-time signal. The radar device 200 is configured to operate in two modes, namely a near range mode and a far range mode. The peak power of the continuous-time signal generated in the near range mode is less than the peak power of the continuous-time signal generated in the far range mode. Also, the pulse length of the continuous-time signal generated in the near range mode is shorter than the pulse length of the continuous-time signal generated in the far range mode.

The radar device 200 also comprises a multiplexer 206, at least one transmitter 208, a signal processor 218, an antenna assembly (with transmitting element(s) 210 and receiving element(s) 212), and at least one receiver 214. The signal processor 218 is configured to generate radar scan data based on received signals 216.

During operations, the waveform generator 204 may generate a continuous-time signal. The continuous-time signal is emitted from the transmitting element 210 in a predetermined direction. The continuous-time signal may reflect off an object (e.g., object 150 of FIG. 1) back towards the radar device 200. The reflected continuous-time signal is received by the receiving element 212 and passed to the receiver 214. The received continuous-time signal provides information about the object's location and velocity. For example, if an object is moving either toward or away from the radar device 200, the received continuous-time signal will have a slightly different frequency than the frequency of the emitted continuous-time signal due to the Doppler effect. Accordingly, the receiver 214 processes the received continuous-time signal to convert the same to a discrete-time signal. The discrete-time signal 216 is passed to the signal processor 218. The signal processor 218 uses the discrete-time signal 216 to reconstruct/recover a signal and generate radar scan data. The radar scan data includes detection information. The detection information includes, but is not limited to, the following information for each detection: a time t, a range r, range rate v, an azimuth angle value θ, and corresponding standard deviations a $\sigma_r$, $\sigma_\theta$, $\sigma_v$. $\sigma_r$ represents a standard deviation for range. $\sigma_\theta$ represents a standard deviation for azimuth angle. $\sigma_v$ represents a standard deviation for range rate.

Figure 3:
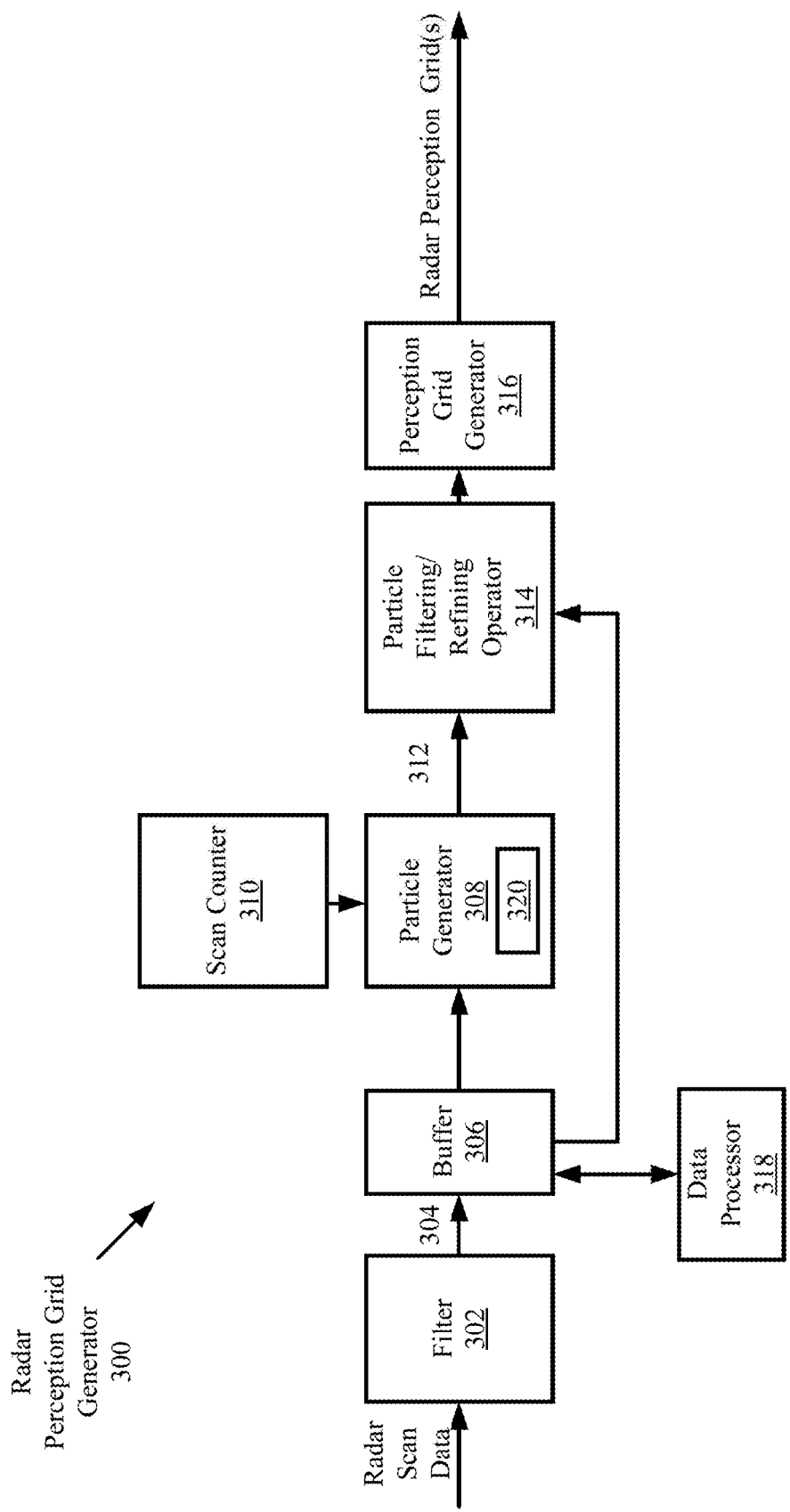
FIG. 3 provides a more detailed illustration of a radar perception grid generator.

Referring now to FIG. 3, there is provided a more detailed illustration of a radar perception grid generator 300. Radar perception grid generator 110 of FIG. 1 can be the same as or similar to radar perception grid generator 300 of FIG. 3. Thus, the discussion of radar perception grid generator 300 is sufficient for understanding radar perception grid generator 110 of FIG. 1.

Radar perception grid generator 110 comprises a filter 302, a buffer 306, a data processor 318, a particle generator 308, a scan counter 310, a particle filtering/refining operator 314 and a perception grid generator 316. The filter 302 is configured to receive the radar scan data and remove detections that reside outside a reachable region, remove data that is associated with false alarm information, and remove data that is associated with low RCS detections. A reachable region is a geographical area that a vehicle can move within and may encounter or collide with an object. The reachable region is obtained using any known or to be known technique. The obtained reachable region may be defined by x-coordinates and y-coordinates. These coordinates can be converted from the XY reference frame to the range-azimuth reference frame. Any known or to be known techniques for converting from an XY reference frame to a range-azimuth reference frame can be used here. The filtered radar scan data 304 is then passed to the buffer 306 for temporary storage.

The data processor 318 may further process the radar scan data stored in the buffer 306. This processing can be performed to: (i) compensate, for each detection, range rates using a known technique to estimate velocity with respect to ground; (ii) convert, for each detection, the range and azimuth coordinates to the XY reference frame; and/or (iii) create, for each detection, a bonding box from the variances. The bounding box is defined by coordinates expressed in a range-azimuth reference frame. Thus, the bounding box is defined by a minimum range value (i.e., r−$\sigma_r$), a maximum range value (i.e., r+$\sigma_r$), a minimum azimuth value (i.e., θ−$\sigma_\theta$), and a maximum azimuth value (i.e., θ+$\sigma_\theta$). Any known or to be known algorithm for achieving (i)-(iii) can be used here.

One known algorithm for compensating range rates generally involves using the vehicle's motion measurement to compensate the effects of vehicle speed and rotation. One known algorithm for converting coordinates in a range-azimuth reference frame to an XY reference frame generally involves using a mapping between range values and x-coordinate values in the XY reference frame and a mapping between azimuth values and y-coordinate values in the XY reference frame.

When the number of radar scans exceeds a threshold (e.g., 5 to 7), the scan counter 310 causes operations of the particle generator 308 to begin. These operations involve obtaining data from buffer 306 associated with at least two different radar scans performed by a single or multiple radar devices. The two radar scans can include, but are not limited to: a first scan of a first radar device (e.g., radar device 102 of FIG. 1) and a last scan of a second radar device (e.g., radar device 104 of FIG. 1); a first scan and a last scan of the first radar device, a first scan and a last scan of the second radar device; a last scan of the first radar device and a first scan of the second radar device. The detection rate of the system can be improved if data is additionally processed that is associated with other radar scans (e.g., a third scan, a fourth scan, etc.).

Figure 4:
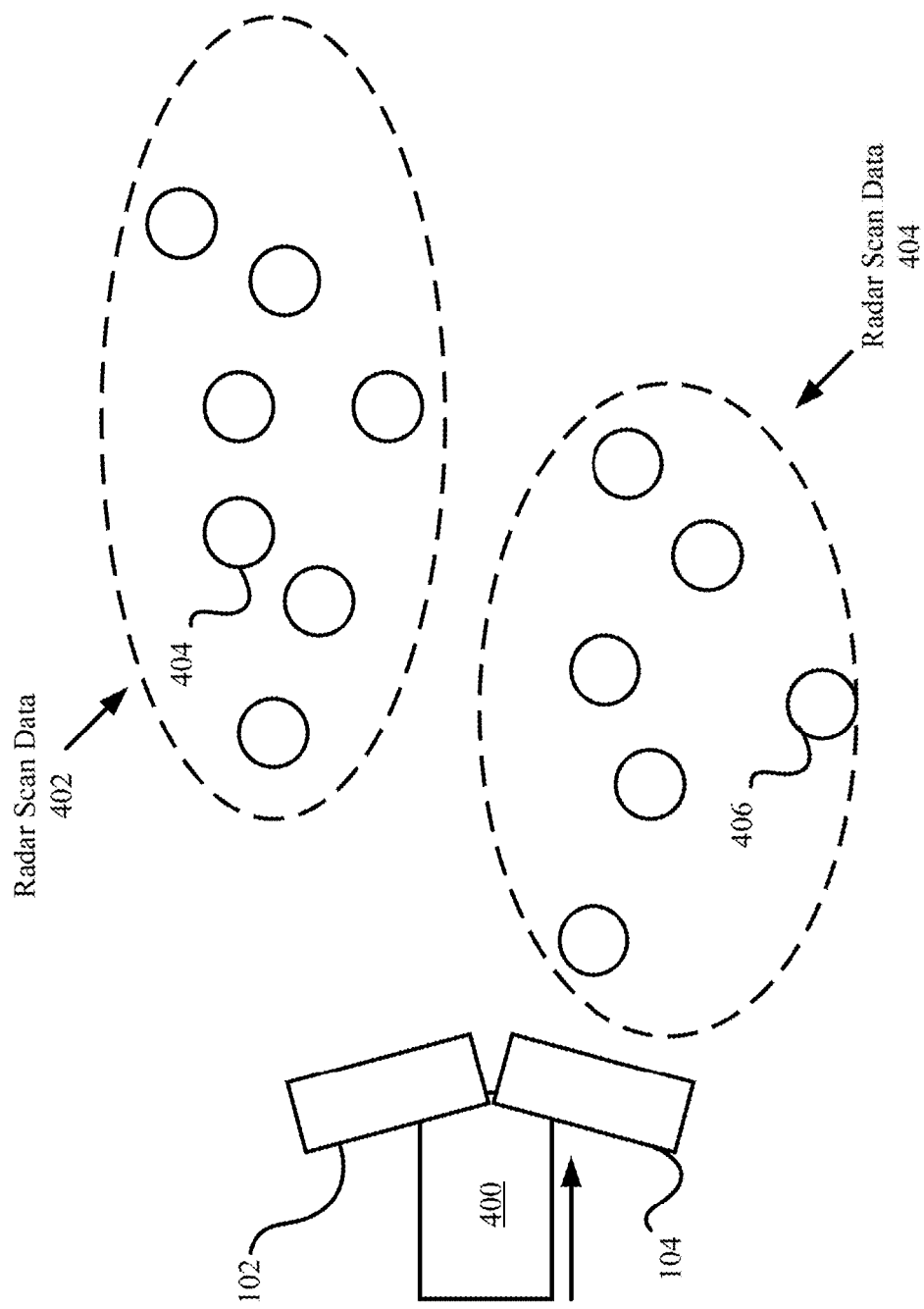
FIG. 4 provides an illustration showing radar scan data.

An illustration is provided in FIG. 4 that shows radar scan data 402 associated with one or more scans performed by the first radar device 102 and radar scan data 404 associated with one or more scans performed by the second radar device 104. Each radar scan data comprises information associated with a plurality of detections 404, 406.

For every detection 404 associated with a scan performed by a radar device 402 or 404, the radar scan data comprises the following information for each detection: a time $t_1$, a range $r_1$, a range rate $v_1$, an azimuth angle value $\theta_1$, and corresponding standard deviations $\sigma_{r1}$, $\sigma_{\theta 1}$, $\sigma_{v1}$. The range rate $v_1$ may include a compensated range rate after considering the radar device's rotation or the rotation of an object 400 (e.g., an AV) on which the radar device is mounted. There may be three range rate ambiguities. In this case, the ambiguity-compensated range rate $v_{amb}$ may be obtained in accordance with the following mathematical equation (1).

$$v_{amb}=v_1+k\times A, \quad (1)$$

where k is a value equal to −1, 0 or 1. $v_1$ represents a range rate of a detection. A represents an ambiguity. The standard deviation $\sigma_{r1}$ may include a standard deviation associated with the ambiguity-compensated range rate $v_{amb}$.

The particle generator 308 performs operations to create particles. These operations begin by searching for pairs of detections in the radar scan data associated with the first scan and second scans. For example, with reference to FIG. 5, pairs of detections are identified using radar scan data 502 associated with a first scan performed by radar device 102 and radar scan data 504 associated with a second scan performed by radar device 104. A pair of detections can include detection $404_1$ and detection $406_N$. Alternatively, pairs of detections are identified using radar scan data 502, 506 associated with two scans performed by the radar device 102. A pair of detections can include detection 4041 and detection $404_N$. The present solution is not limited to the particulars of this example.

This searching for (or identification of) detection pairs is achieved using a search region or window. The search region or window is expressed in a range-azimuth reference frame. In some scenarios, an approximate rectangle searchable region is created using a minimum range value, maximum range value, minimum azimuth value, and maximum azimuth value.

In other scenarios, the searching window ($r_{min}$, $r_{max}$) in range may be defined by the following mathematical equations (2) and (3).

$$r_{min}=r'-(\sigma_{v1}\cdot \Delta t)-(c_r\cdot \sigma_{r1}) \quad (2)$$

$$r_{max}=r'-(\sigma_{v1}\cdot \Delta t)-(c_r\cdot \sigma_{r1}) \quad (3)$$

where $c_r$ represents a constant scale factor in range (e.g., 2.5) and r' represents an expected range in the second scan assuming the time difference between the two scans is Δt. The expected range r' in the second scan is defined by the following mathematical equation (4).

$$r' \approx r_1 + (v_{amb1} \cdot \Delta t) \quad (4)$$

Given a maximum lateral speed $V_{lateralmax}$ (e.g., 2.2 m/s), the searching window in azimuth may be defined by the following mathematical equations (5) and (6).

$$\theta_{min} = \theta_1 - (v_{lateralmax} \cdot \Delta t)/r' - (c_\theta \cdot \sigma_{\theta1}) + (v_{\theta1} \cdot \Delta t) \quad (5)$$

$$\theta_{max} = \theta_1 + (v_{lateralmax} \cdot \Delta t)/r' - (c_\theta \cdot \sigma_{\theta1}) + (v_{\theta1} \cdot \Delta t) \quad (6)$$

where $c_\theta$ represents a constant scale factor in azimuth (e.g., 2.5). Vθ1 represents a range rate of a detection (e.g., detection $40_N$ of FIG. 5) of the scan performed by the first radar device 402 which falls in the search window at time t.

Referring again to FIG. 5, a polygon search window can be employed when the radar scan data 402, 404 is associated with scans by the two radar devices 102, 104. In this scenario, the particle generator 308 may perform operations to obtain a polygon by transforming the search region defined in the first radar's framework into the second radar's framework. The particle generator 308 can then search for detections 406 in the radar scan data 504 within the polygon. As a result of the searching, the particle generator 308 identifies a detection $406_N$ of the radar scan data 404 which reside in the polygon and which can be paired with the detection $404_1$ of the radar scan data 502 or the detection $404_N$ of the radar scan data 506. The present solution is not limited to the particulars of this scenario.

Each identified detection (for example, detection $406_N$ of FIG. 5) has an associated time $t_2$, range $r_2$, range rate $v_2$, azimuth angle $\theta_2$, and corresponding standard deviations (or variances) $\sigma_{r2}$, $\sigma_{\theta2}$, $\sigma_{v2}$. The particle generator checks whether the range value of the identified detection falls between minimum and maximum range values (which may be scaled based on the standard deviation and/or a scale factor), and the azimuth angle value of the identified detection falls within minimum and maximum azimuth angle values (which may be scaled based on the standard deviation and/or scale factor). These checks can be defined by the following mathematical equations (7) and (8).

$$r_{min} - (c_r \cdot \sigma_{r2}) < r_2 < r_{max} + (c_r \cdot \sigma_{r2}) \quad (7)$$

$$\theta_{min} - (c_\theta \cdot \sigma_{\eta2}) < \theta_2 < \theta_{max} + (c_\theta \cdot \sigma_{\theta2}) \quad (8)$$

Figure 5:
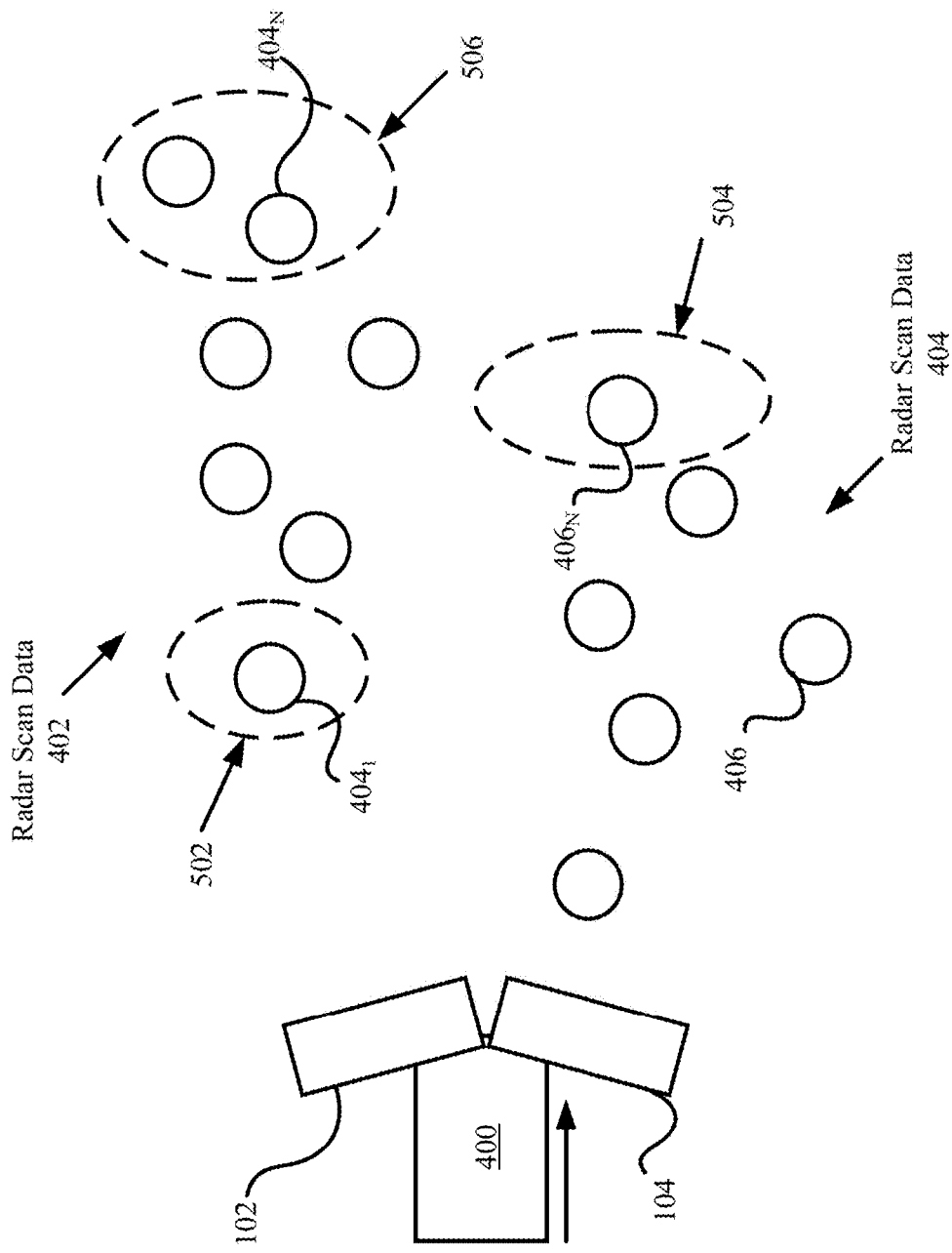
FIG. 5 provides an illustration showing search windows for the radar scan data of FIG. 4.

If the range and azimuth values fall within the min-max ranges, the particle generator 308 calculates the positions of the paired detections (for example, detections $404_1$, $404_N$ or $404_N$, $406_N$ of FIG. 5) in the frame of the object 400 (e.g., vehicle frame). The frame of the object is referred to herein as an XY reference frame. For example, the position of detection $404_N$ in the XY reference frame is defined by an x-coordinate $x_1$ and a y-coordinate $y_1$. The position of detection 406 N in the XY reference frame is defined by an x-coordinate $x_2$ and a y-coordinate $y_2$. Any known or to be known technique can be used here to compute detection positions in an XY reference frame.

The xy-positions are used to determine a 2D initial particle velocity $(v_x, v_y)$. The 2D initial particle velocity is defined by the following mathematical equations (9) and (10).

$$v_x = (x_2 - x_1)/\Delta t \quad (9)$$

$$v_y = (y_2 - y_1)/\Delta t \quad (10)$$

The 2D initial particle velocity is then projected onto the range rate direction associated with the radar scan data 404 to obtain a projected range rate $v_2'$. The projected range rate $v_2'$ is defined by the following mathematical equation (11).

$$v_2' = ((v_x \cdot x_2) + (v_y \cdot y_2))/\text{sqr}(x_2^2 + y_2^2) \quad (11)$$

The particle generator 308 checks whether the projected range rate $v_2'$ matches the range rate associated with the detection $406_N$ (which may or may not be adjusted based on a known ambiguity and/or a tolerance) by a certain amount. Stated differently, a check is performed whether the projected range rate $v_2'$ falls between minimum and maximum range rate values. This check operation may be defined by the following mathematical equations (12) and (13). A check defined by mathematical equation (14) may optionally be performed in addition to the range rate check. This check compares a difference between range rates of the pair's detections to a threshold.

$$v_{min} < v_2' < v_{max}, \quad (12)$$

which may be rewritten as $$v_2 + A - T < v_2' < v_2 + A + T \quad (13)$$

$$\text{abs}(v_1 - v_2) < thr \quad (14)$$

A represents an ambiguity, T represents a tolerance (e.g., 0.5 m/s), and thr represents a threshold. If check(s) is(are) satisfied, then the following information is stored in a datastore 320 to define an initial particle: time $t_1$, position $(x_1, y_1)$, 2D initial particle velocity $(v_x, v_y)$ and the variances $\sigma_{r1}$, $\sigma_{\theta1}$, $\sigma_{v1}$. The above process is repeated for each pair of detections in the search window.

After the particles have been created, the operator 314 performs operations to filter and refine the particles. These operations involve identifying matched detections from other scans performed by the radar devices 102, 104. For each particle, the operator 314 calculates an expected particle position $(x_i', y_i')$ at a time of validity $t_i$ for an $i^{th}$ radar scan performed by one of the radar devices. The expected particle position is defined by the following mathematical equations (13) and (14).

$$x_i' = x_1 + (t_i - t_1)v_x \quad (13)$$

$$y_i' = y_1 + (t_i - t_1)v_y \quad (14)$$

The operator 314 then computes a range and an azimuth angle for the expected particle position. This range computation is defined by the following mathematical equation (15), and the azimuth angle computation is defined by the following mathematical equation (16).

$$r_i' = \text{sqr}(x_i'^2 + y_i'^2) \quad (15)$$

$$\theta_i' = a\tan(y_i'/x_i') + v_{\theta1}(t_i - t_1) \quad (16)$$

The vehicle's azimuth rotation effect is included here. The variances $\sigma_{ri'}$ and $\sigma_{\theta i'}$ are also obtained by the operator 314.

For a $j^{th}$ detection in the $i^{th}$ radar scan data, the operator 314 checks whether the $j^{th}$ detection overlaps with the particle. The $j^{th}$ detection has the following values associated therewith: a time $t_i$, a range $r_j$, a range rate $v_j$, an azimuth angle $\theta_j$, and variances $\sigma_{rj}$, $\sigma_{\theta j}$, $\sigma_{vj}$. This check operation may be defined by the following mathematical equations (17) and (18).

$$r_i' - (c_r \cdot \sigma_{ri'}) - (c_r \cdot \sigma_{rj}) < r_j < r_i' + (c_r \cdot \sigma_{ri'}) + (c_r \cdot \sigma_{rj}) \quad (17)$$

$$\theta_i' - (c_\theta - (c_\theta \cdot \sigma_{\theta j}) < \theta_j < \theta_i' + (c_\theta \cdot \sigma_{\theta i'}) + (c_\theta \cdot \sigma_{\theta j}) \quad (18)$$

The operator 314 also checks whether the velocity of the detection is consistent with the particle velocity. If these conditions are met, a matching count $C_{matching}$ for that radar device is increased and the detection is considered a matched detection for use in subsequent operations. This process may be repeated from all detections in the $i^{th}$ radar scan data performed by radar device 102, all detections in the $i^{th}$ radar scan data performed by radar device 104, and all detections in buffered data associated with other radar scans performed by both radar devices 102, 104.

After processing buffered detections for all radar scans, the matching count $C_{matching}$ is compared to a threshold $thr_{count}$. The particle is considered a valid particle when the matching count is greater than the threshold (i.e., $C_{matching} > thr_{count}$) Otherwise, the particle is considered an invalid particle.

The operator 314 then performs a particle refinement process using the valid particles. Assuming there are M matched detections for a given valid particle, the associated radar scan data is converted from a range-azimuth reference frame to an XY reference frame, i.e., $$[t_k, r_k, \theta_k, v_k, \sigma_{rk}, \sigma_{\theta k}, \sigma_{vk}] \rightarrow [t_k, x_k, y_k, v_k, \sigma_{xk}, \sigma_{xyk}, \sigma_{vk}]$$

where k is an integer between one and M. This information is used to estimate the refined particle information [x, y, $v_x$, $v_y$] using a weighted least square algorithm. The weighted least square algorithm can be defined by the following mathematical equation (19).

$$\begin{bmatrix} x_1 \\ y_1 \\ v_1 \\ x_2 \\ y_2 \\ z_2 \\ \cdots \end{bmatrix}_{3N \times 1} = \begin{bmatrix} 1 & 0 & t_1 & 0 \\ 0 & 1 & 0 & t_1 \\ 0 & 0 & \cos(\theta_1) & \sin(\theta_1) \\ 1 & 0 & t_2 & 0 \\ 0 & 1 & 0 & t_2 \\ 0 & 0 & \cos(\theta_2) & \sin(\theta_2) \\ \cdots & \cdots & \cdots & \cdots \end{bmatrix}_{3N \times 4} \cdot \begin{bmatrix} x \\ y \\ v_x \\ v_y \end{bmatrix}_{4 \times 1}$$

Mathematical equation (19) can be rewritten as mathematical equation (20).

$$Y = X \cdot \beta \quad (20)$$

$\beta$ can be defined as follows.

$$\beta \leq (X^T W X)^{-1} X^T W Y \quad (21)$$

where W is a 3M×3M weight matrix with element $w_{i,j} = 1/\sigma^2_{i,j}$ as shown below.

$$W = \begin{bmatrix} \frac{1}{\sigma^2_{x1}} & \frac{1}{\sigma^2_{xy1}} & 0 & 0 & 0 & 0 & \cdots \\ \frac{1}{\sigma^2_{xy1}} & \frac{1}{\sigma^2_{y1}} & 0 & 0 & 0 & 0 & \cdots \\ 0 & 0 & \frac{1}{\sigma^2_{v1}} & 0 & 0 & 0 & \cdots \\ 0 & 0 & 0 & \frac{1}{\sigma^2_{x2}} & \frac{1}{\sigma^2_{xy2}} & 0 & \cdots \\ \cdots & \cdots & \cdots & \cdots & \cdots & \cdots & \end{bmatrix} \quad (22)$$

Therefore, the refined particle information [x, y, $v_x$, $v_y$] can be estimated. The variances of the estimate refined particle information may be calculated in accordance with known techniques. The X matrix may be singular. In this case, a pseudo inverse may be employed.

The operator 314 may also use all detections associated with a particle to re-estimate the position and velocity for the particle. A regression algorithm may be employed here. The regression algorithm can be defined by the following mathematical equations (23)-(25).

$$x_i = x + v_x \cdot t_i$$

$$y_i = y + v_y \cdot t_i \quad (23)$$

and the particle information can be estimated as:

$$v_x = \frac{\sum_i (t_i - \bar{t}) \cdot (x_i - \bar{x})}{\sum_i (t_i - \bar{t})^2} \quad (24)$$

$$v_y = \frac{\sum_i (t_i - \bar{t}) \cdot (y_i - \bar{y})}{\sum_i (t_i - \bar{t})^2}$$

$$x = \bar{x} - v_x \cdot \bar{t} \quad (25)$$

$$y = \bar{y} - v_y \cdot \bar{t}$$

The operator 314 then passes the filtered and refined particles to the perception grid generator 316. At the perception grid generator 316, a radar perception grid is built using the filtered and refined particles. Any known or to be known technique for creating a radar grid from samples can be used here. An illustrative radar perception grid 600 is shown in FIG. 6. A particle cell may be dilated to cover a larger area. The estimated variance can be used to expand the radar perception grid to represent a size of the target object. The estimate variance can be defined by the following mathematical equations (26) and (27).

$$\sigma_{v_x} = \sqrt{\frac{\sum (x_{i,cal} - x_i)^2}{(N-2) \cdot \sum (t_{i,cal} - \bar{t})^2}} \quad (26)$$

$$\sigma_{v_y} = \sqrt{\frac{\sum (y_{i,cal} - y_i)^2}{(N-2) \cdot \sum (t_{i,cal} - \bar{t})^2}}$$

$$\sigma_x = \sqrt{\frac{\sum (x_{i,cal} - x_i)^2 \cdot \sum t_i^2}{N(N-2) \sum (t_i - \bar{t})^2}} \quad (27)$$

$$\sigma_y = \sqrt{\frac{\sum (y_{i,cal} - y_i)^2 \cdot \sum t_i^2}{N(N-2) \sum (t_i - \bar{t})^2}}$$

Referring now to FIG. 7, there is provided an illustrative method 700 for operating a radar system (e.g., radar system 100 of FIG. 1). The operations of method 700 can be performed by a radar perception grid generator (for example, radar perception grid generator 110 of FIG. 1 and/or 300 of FIG. 3) of a radar system (e.g., radar system 100 of FIG. 1) and/or a computing device (for example, computing device 1100 of FIG. 11). The operations of method 700 can also be performed in the same or different order than that shown in FIG. 7. For example, the radar scan data can be stored in the datastore prior to performance of operations in block 710-714 rather than after as shown in FIG. 7.

Figure 7A:
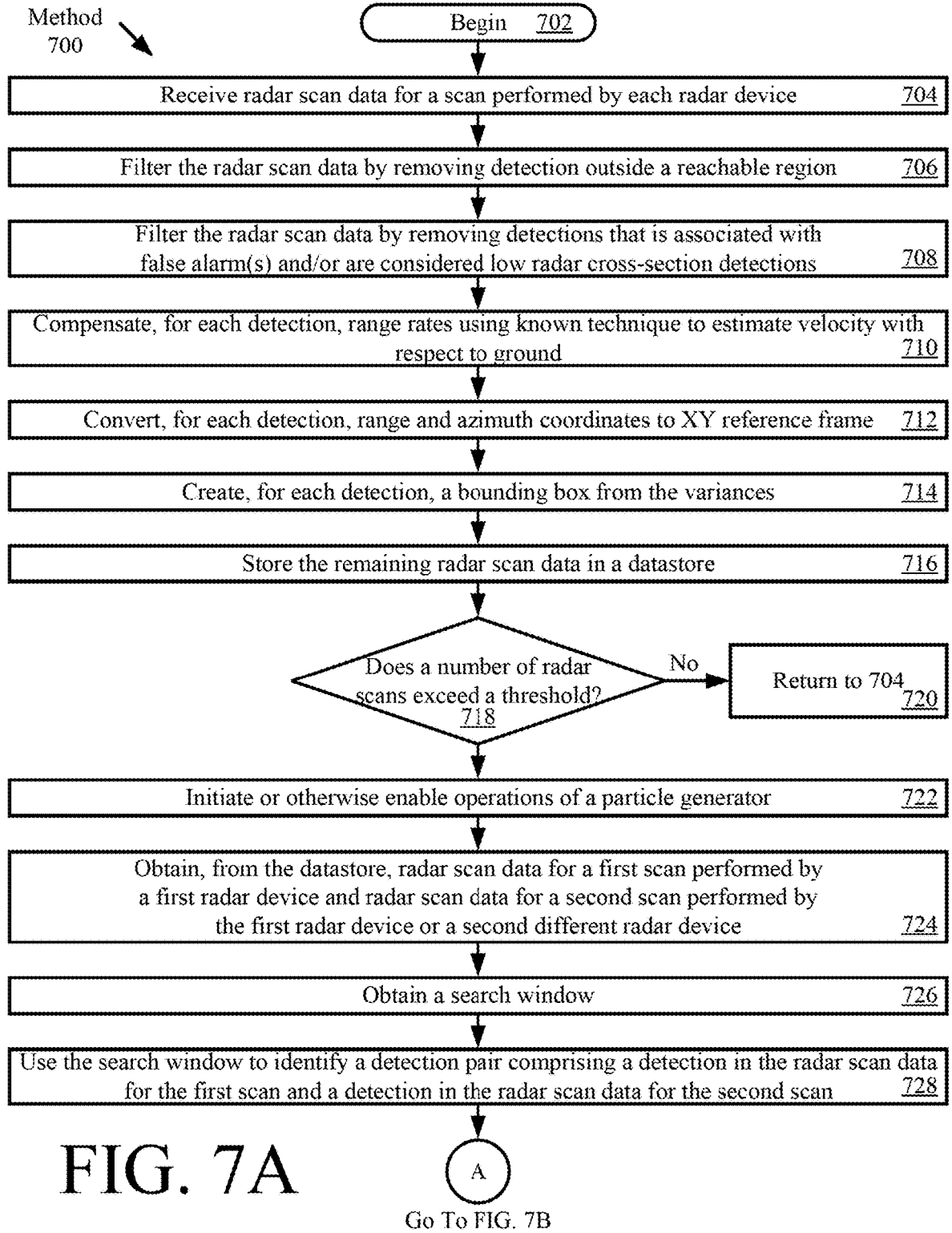

As shown in FIG. 7A, method 700 begins with 702 and continues with 704 where the system receives scan data (for example, radar scan data 106, 108 of FIG. 1 and/or radar scan data 402, 404 of FIGS. 4-5) for a scan performed by each radar device (for example, radar devices 102 and 104 of FIG. 1). The radar scan data is filtered in 706-708 to remove detections outside a reachable region, remove detections that are associated with false alarms, and/or remove detections that are considered low RCS detections. The filtered radar scan data is processed in 710-714 to: compensate, for each detection, range rate values relative to an estimated velocity with respect to ground; convert, for each detection, range and azimuth coordinates to an XY reference frame; and create, for each detection, a bounding box from variances. The radar scan data is then stored in a datastore (for example, buffer 306 of FIG. 3) as shown by 716.

In 718, the system checks whether a number of scans exceeds a threshold. A scan counter (for example, scan counter 310 of FIG. 3) can be used to assist with this check. If not [718:NO], then method 700 returns to 704 as shown by block 720. If so [718:YES], then method 700 continues with 722 where operations of a particle generator (for example, particle generator 308 of FIG. 3) are initiated or otherwise enabled.

Once enabled, the particle generator performs operations in 724 to obtain the following information from the datastore: radar scan data (for example, radar scan data 502 or 506 of FIG. 5) for a first scan performed by a first radar device (for example, radar device 102 of FIG. 1); and radar scan data (for example, radar scan data 504 or 506 of FIG. 5) for a second scan performed by the first radar device or a second different radar device (for example, radar device 104 of FIG. 1).

Next in 726, a search window is obtained. The search window may be defined by a minimum range, a maximum range, a minimum azimuth, and a maximum azimuth. The search window is used in 728 to identify a detection pair comprising a detection (for example, detection $404_1$ or $404_N$ of FIG. 5) in the radar scan data (for example, radar scan data 502 or 506 of FIG. 5) for the first scan and a detection (for example, detection $404_N$ or $406_N$ of FIG. 5) in the radar scan data for the second scan. If a detection of the second scan has a range value falling between the minimum and maximum ranges of the search window and an azimuth value falling between the minimum and maximum azimuths of the search window, then the detection is considered a part to the detection of the first scan. Upon identifying a detection pair, method 700 continues with 730 of FIG. 7B.

Block 730 involves obtaining positions of the two detections in the pair. The positions are considered xy-positions since they are represented in the XY reference frame. Each xy-position is defined by an x coordinate and a y coordinate. The xy-positions are used in 732 to compute a 2D initial particle velocity ($v_x$, $v_y$). The 2D initial particle velocity may be computed in accordance with the above-provided mathematical equations (9) and (10).

The 2D initial particle velocity is used in 734 to obtain a projected range rate $v_2'$ for the second scan detection of the pair. The projected range rate $v_2'$ can be computed in accordance with the above-provided mathematical equation (11). A check is then performed to determine whether the projected range rate $v_2'$ matches the range rate $v_2$ of the scan by a certain amount. This check can be achieved using the above-provided mathematical equation (12). If the projected range rate $v_2'$ does not match the range rate $v_2$ of the scan by a certain amount [736:NO], then operations of 738 are performed where method 700 returns to 728 of FIG. 7A so that the process is repeated for a next pair of detections. In contrast, if the projected range rate $v_2'$ does match the range rate $v_2$ of the scan by the certain amount [736:YES], then method 700 continues to 740 where a particle is created. The particle is defined by the xy-position of the pair's first scan detection (for example, detection $404_1$ or $404_N$ of FIG. 5) and a range rate that set equal to the 2D initial particle velocity.

Once all of the particles have been created, method 700 continues with 742 where a particle is selected from the plurality of particles. A bounding box is selected, from the plurality of previously generated bounding boxes, that is associated with the first scan detection of the pair. The bounding box is used in 744 to identify matched detection(s) from the other scans performed by the first radar device and/or the second radar device. A matched detection is a detection with a position located inside the bounding box. A matched detection can be identified in accordance with the above-provided mathematical equations (17) and (18). In 746, a decision is made as to the validity of the particle. The particle is considered to be a valid particle when a total number of matched detections exceeds a count threshold. Otherwise, the particle is considered an invalid particle. The converted radar scan data is used in 750 to obtain a refined xy-position (x, y) and a refined range rate ($v_x$, $v_y$) for the valid particle. A least square algorithm can be employed in 750. The least square algorithm can be defined by the above-provided mathematical equations (19)-(22). Variances are computed in 752 for the refined xy-positions and range rates.

A radar perception grid is generated in 754 using the valid particles with the refined xy-positions, range rates and variances. The radar perception grid may be generated, for example, in accordance with a known technique that uses an inverse sensor model to convert each particle into a set of cells in a grid that describe a likelihood of the particle coming from a particular cell. Angular variance and range variance may be used to determine what cells should be include in the set and the confidence that they are the cells that had the object that returned the cell. Subsequently, 756 is performed where method 700 ends or other operations are performed (for example, return to 702).

Illustrative Vehicle Based Systems

Figure 8:
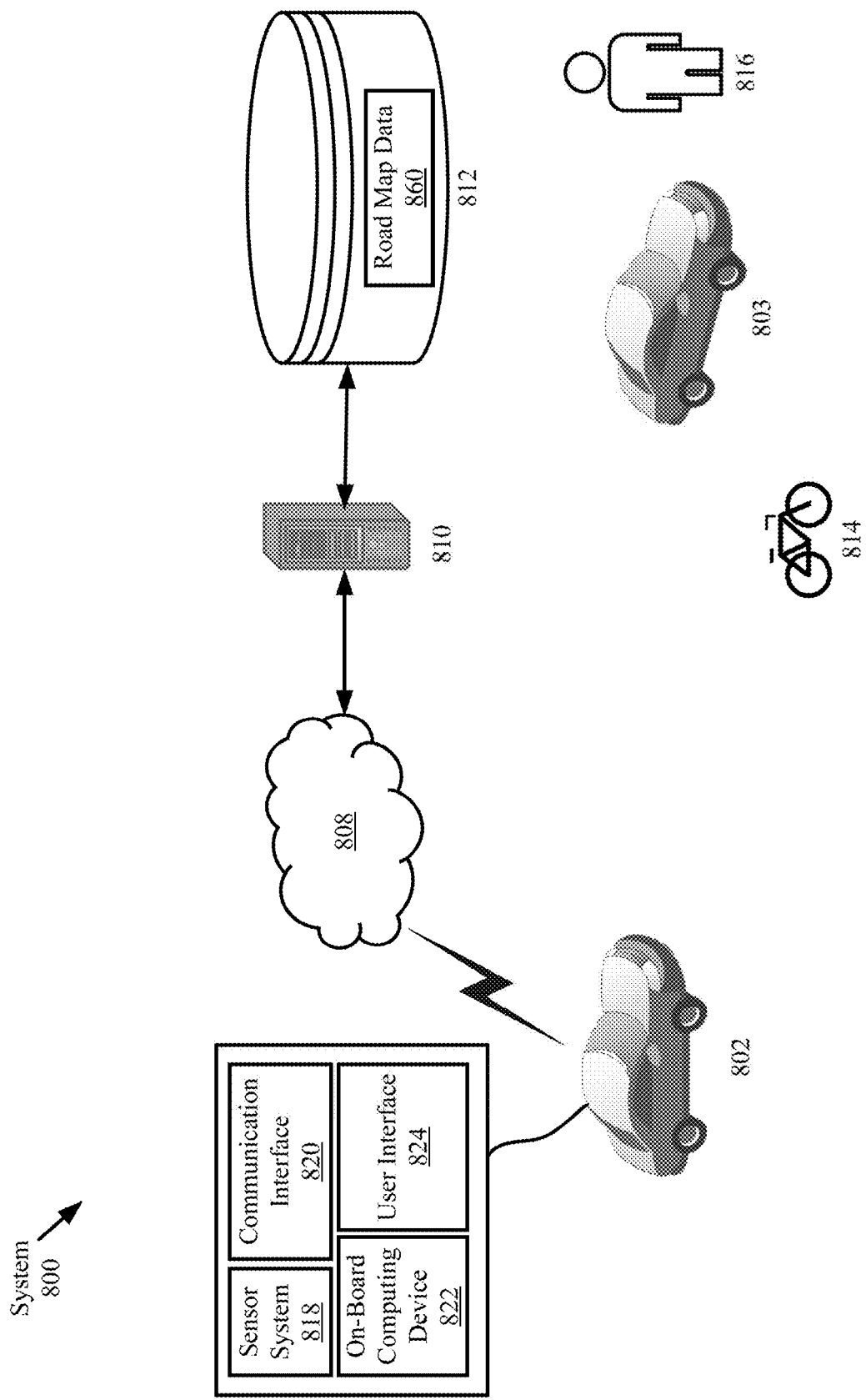
FIG. 8 provides an illustration of a system implementing the present solution.

FIG. 8 illustrates an example system 800, in accordance with aspects of the disclosure. System 800 comprises a vehicle 802 that is traveling along a road in a semi-autonomous or autonomous manner. Vehicle 802 is also referred to in this document as AV 802. AV 802 can include, but is not limited to, a land vehicle (as shown in FIG. 8), an aircraft, or a watercraft. As noted above, except where specifically noted this disclosure is not necessarily limited to AV embodiments, and it may include non-autonomous vehicles in some embodiments.

AV 802 is generally configured to detect objects in its proximity. The objects can include, but are not limited to, a vehicle 803, cyclist 814 (such as a rider of a bicycle, electric scooter, motorcycle, or the like) and/or a pedestrian 816.

As illustrated in FIG. 8, the AV 802 may include a sensor system 818, an on-board computing device 822, a communications interface 820, and a user interface 824. Autonomous vehicle system may further include certain components (as illustrated, for example, in FIG. 9) included in vehicles, which may be controlled by the on-board computing device 822 using a variety of communication signals and/or commands, such as, for example, acceleration signals or commands, deceleration signals or commands, steering signals or commands, braking signals or commands, etc.

The sensor system 818 may include one or more sensors that are coupled to and/or are included within the AV 802. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 802, information about the environment itself, information about the motion of the AV 802, information about a route of the vehicle, or the like. As AV 802 travels over a surface, at least some of the sensors may collect data pertaining to the surface.

The AV 802 may also communicate sensor data collected by the sensor system to a remote computing device 810 (for example, a cloud processing system) over communications network 808. Remote computing device 810 may be configured with one or more servers to perform one or more processes of the technology described in this document. Remote computing device 810 may also be configured to communicate data/instructions to/from AV 802 over network 808, to/from server(s) and/or datastore(s) 812. Datastore(s) 812 may include, but are not limited to, database(s).

Network 808 may include one or more wired or wireless networks. For example, the network 808 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 802 may retrieve, receive, display, and edit information generated from a local application or delivered via network 808 from datastore 812. Datastore 812 may be configured to store and supply raw data, indexed data, structured data, road map data 860, program instructions or other configurations as is known.

The communications interface 820 may be configured to allow communication between AV 802 and external systems, such as, for example, external devices, sensors, other vehicles, servers, data stores, databases, etc. The communications interface 820 may utilize any now or hereafter known protocols, protection schemes, encodings, formats, packaging, etc. such as, without limitation, Wi-Fi, an infrared link, Bluetooth, etc. The user interface system 824 may be part of peripheral devices implemented within the AV 802 including, for example, a keyboard, a touch screen display device, a microphone, and a speaker, etc. The vehicle also may receive state information, descriptive information or other information about devices or objects in its environment via the communication interface 820 over communication links such as those known as vehicle-to-vehicle, vehicle-to-object or other V2X communication links. The term "V2X" refers to a communication between a vehicle and any object that the vehicle may encounter or affect in its environment.

Figure 9:
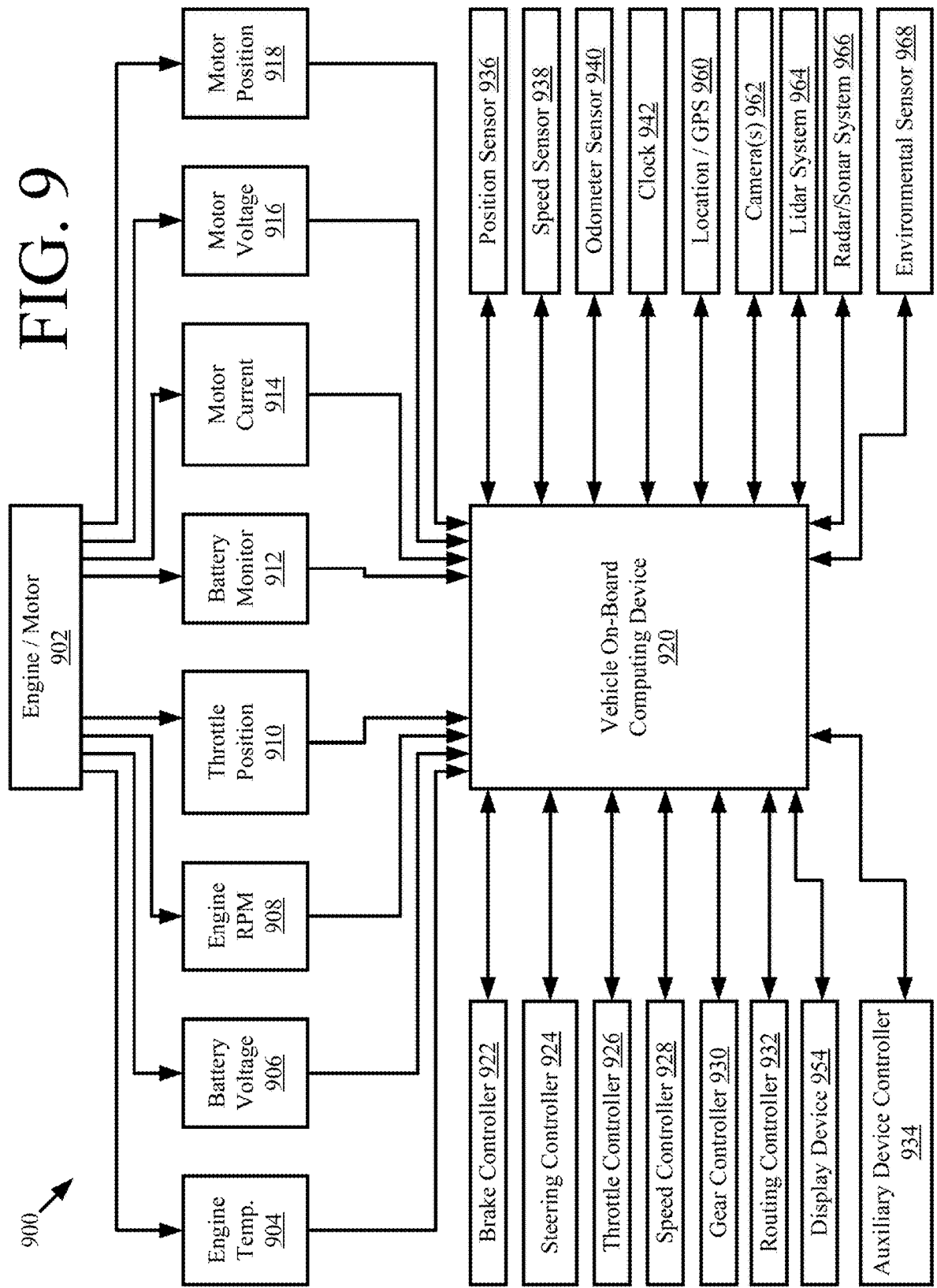
FIG. 9 provides an illustration of an illustrative architecture for a vehicle.

FIG. 9 illustrates an example system architecture 900 for a vehicle, in accordance with aspects of the disclosure. Vehicles 802 and/or 803 of FIG. 8 can have the same or similar system architecture as that shown in FIG. 9. Thus, the following discussion of system architecture 900 is sufficient for understanding vehicle(s) 802, 803 of FIG. 8. However, other types of vehicles are considered within the scope of the technology described in this document and may contain more or less elements as described in association with FIG. 9. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 9, system architecture 900 for a vehicle includes an engine or motor 902 and various sensors 904-918 for measuring various parameters of the vehicle. In gas-powered or hybrid vehicles having a fuel-powered engine, the sensors may include, for example, an engine temperature sensor 904, a battery voltage sensor 906, an engine revolutions per minute (RPM) sensor 908, and a throttle position sensor 910. If the vehicle is an electric or hybrid vehicle, then the vehicle may have an electric motor, and accordingly includes sensors such as a battery monitoring system 912 (to measure current, voltage and/or temperature of the battery), motor current 914 and voltage 916 sensors, and motor position sensors 918 such as resolvers and encoders.

Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 960 (such as a Global Positioning System (GPS) device); object detection sensors such as one or more cameras 962; a lidar system 964; and/or a radar and/or a sonar system 966. The sensors also may include environmental sensors 968 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 920. The vehicle on-board computing device 920 may be implemented using the computer system of FIG. 11. The vehicle on-board computing device 920 analyzes the data captured by the sensors and optionally controls operations of the vehicle based on results of the analysis. For example, the vehicle on-board computing device 920 may control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. Auxiliary device controller 934 may be configured to control one or more auxiliary devices, such as testing systems, auxiliary sensors, mobile devices transported by the vehicle, etc.

Geographic location information may be communicated from the location sensor 960 to the vehicle on-board computing device 920, which may then access a map of the environment that corresponds to the location information to determine known fixed features of the environment such as streets, buildings, stop signs and/or stop/go signals. Captured images from the cameras 962 and/or object detection information captured from sensors such as lidar system 964 is communicated from those sensors) to the vehicle on-board computing device 920. The object detection information and/or captured images are processed by the vehicle on-board computing device 920 to detect objects in proximity to the vehicle. Any known or to be known technique for making an object detection based on sensor data and/or captured images can be used in the embodiments disclosed in this document.

Lidar information is communicated from lidar system 964 to the vehicle on-board computing device 920. Additionally, captured images are communicated from the camera(s) 962 to the vehicle on-board computing device 920. The lidar information and/or captured images are processed by the vehicle on-board computing device 920 to detect objects in proximity to the vehicle. The manner in which the object detections are made by the vehicle on-board computing device 920 includes such capabilities detailed in this disclosure.

In addition, the system architecture 900 may include an onboard display device 954 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 920 may include and/or may be in communication with a routing controller 932 that generates a navigation route from a start position to a destination position for an autonomous vehicle. The routing controller 932 may access a map data store to identify possible routes and road segments that a vehicle can travel on to get from the start position to the destination position. The routing controller 932 may score the possible routes and identify a preferred route to reach the destination. For example, the routing controller 932 may generate a navigation route that minimizes Euclidean distance traveled or other cost function during the route, and may further access the traffic information and/or estimates that can affect an amount of time it will take to travel on a particular route. Depending on implementation, the routing controller 932 may generate one or more routes using various routing methods, such as Dijkstra's algorithm, Bellman-Ford algorithm, or other algorithms. The routing controller 932 may also use the traffic information to generate a navigation route that reflects expected conditions of the route (for example, current day of the week or current time of day, etc.), such that a route generated for travel during rush-hour may differ from a route generated for travel late at night. The routing controller 932 may also generate more than one navigation route to a destination and send more than one of these navigation routes to a user for selection by the user from among various possible routes.

In various embodiments, the vehicle on-board computing device 920 may determine perception information of the surrounding environment of the AV. Based on the sensor data provided by one or more sensors and location information that is obtained, the vehicle on-board computing device 920 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 920 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 920 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 920 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 920 may perform one or more prediction and/or forecasting operations. For example, the vehicle on-board computing device 920 may predict future locations, trajectories, and/or actions of one or more objects. For example, the vehicle on-board computing device 920 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 920 may predict whether the object will likely move straight forward or make a turn. If the perception data indicates that the intersection has no traffic light, the vehicle on-board computing device 920 may also predict whether the vehicle may have to fully stop prior to entering the intersection.

In various embodiments, the vehicle on-board computing device 920 may determine a motion plan for the autonomous vehicle. For example, the vehicle on-board computing device 920 may determine a motion plan for the autonomous vehicle based on the perception data and/or the prediction data. Specifically, given predictions about the future locations of proximate objects and other perception data, the vehicle on-board computing device 920 can determine a motion plan for the AV that best navigates the autonomous vehicle relative to the objects at their future locations.

In some embodiments, the vehicle on-board computing device 920 may receive predictions and make a decision regarding how to handle objects and/or actors in the environment of the AV. For example, for a particular actor (for example, a vehicle with a given speed, direction, turning angle, etc.), the vehicle on-board computing device 920 decides whether to overtake, yield, stop, and/or pass based on, for example, traffic conditions, map data, state of the autonomous vehicle, etc. Furthermore, the vehicle on-board computing device 920 also plans a path for the AV to travel on a given route, as well as driving parameters (for example, distance, speed, and/or turning angle). That is, for a given object, the vehicle on-board computing device 920 decides what to do with the object and determines how to do it. For example, for a given object, the vehicle on-board computing device 920 may decide to pass the object and may determine whether to pass on the left side or right side of the object (including motion parameters such as speed). The vehicle on-board computing device 920 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 920 may execute one or more control instructions to perform a cautious maneuver (for example, mildly slow down, accelerate, change lane, or swerve). In contrast, if the collision cannot be avoided, then the vehicle on-board computing device 920 may execute one or more control instructions for execution of an emergency maneuver (for example, brake and/or change direction of travel).

As discussed above, planning and control data regarding the movement of the autonomous vehicle is generated for execution. The vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 10:
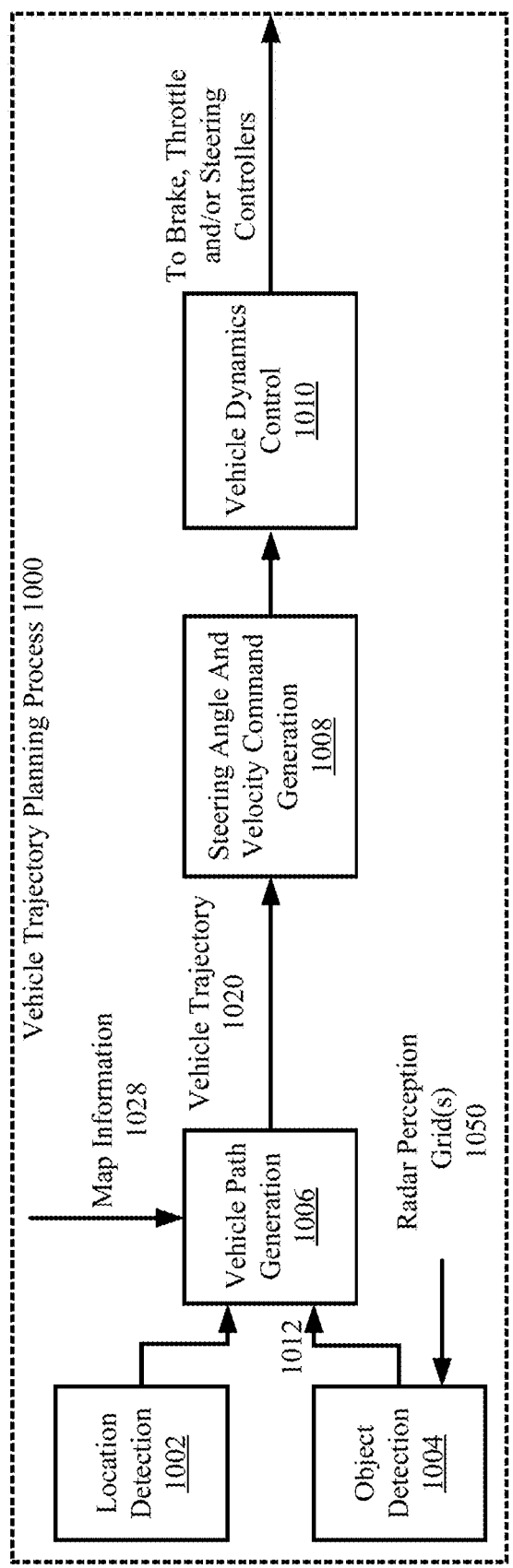
FIG. 10 provides a block diagram that is useful for understanding how control of a vehicle is achieved in accordance with the present solution.

Referring now to FIG. 10, there is provided a block diagram that is useful for understanding how vehicle control is achieved in accordance with the present solution. All of the operations performed in blocks 1002-1010 can be performed by the on-board computing device (e.g., vehicle on-board computing device 920 of FIG. 9) of a vehicle (e.g., AV 802 of FIG. 8), and is referred to as a vehicle trajectory planning process 1000.

In block 1002, a location of the vehicle is detected. This detection can be made based on sensor data output from a location sensor (e.g., location sensor 960 of FIG. 9) of the vehicle. This sensor data can include, but is not limited to, Global Positioning System (GPS) data. The detected location of the vehicle is then passed to block 1006.

In block 1004, an object is detected within proximity of the vehicle. This detection is made based on sensor data output from a radar system (e.g., radar system 100 of FIG. 1, and/or radar system 966 of FIG. 9), a LiDAR system (e.g., a LiDAR system 964 of FIG. 9) and/or a camera (e.g., camera 962 of FIG. 9) of the vehicle. The sensor data output from the radar system includes, but is not limited to, a radar perception grid 1050 for the object. The radar perception grid 1050 is the same as or similar to the radar perception grid 112 of FIG. 1. The sensor data is also used to determine one or more possible object trajectories for the detected object. The possible object trajectories can include, but are not limited to, the following trajectories:
- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the AV) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 1012 is(are) then passed to block 1006.

In block 1006, a vehicle trajectory 1020 is generated using the information from blocks 1002 and 1004. Techniques for determining a vehicle trajectory are well known in the art, and therefore will not be described herein. Any known or to be known technique for determining a vehicle trajectory can be used herein without limitation. In some scenarios, the vehicle trajectory 1020 is determined based on the location information from block 1002, the object detection/trajectory information from block 1004, and map information 1028 (which is pre-stored in a data store of the vehicle). The vehicle trajectory 1020 represents a smooth path that does not have abrupt changes that would otherwise provide passenger discomfort. The vehicle trajectory 1020 is then provided to block 1008.

In block 1008, a steering angle and velocity command is generated based on the vehicle trajectory 1020. The steering angle and velocity command is provided to block 1010 for vehicle dynamics control. The vehicle dynamics control causes the vehicle to decelerate, cause the vehicle to accelerate, and/or cause the vehicle to change its direction of travel.

Figure 11:
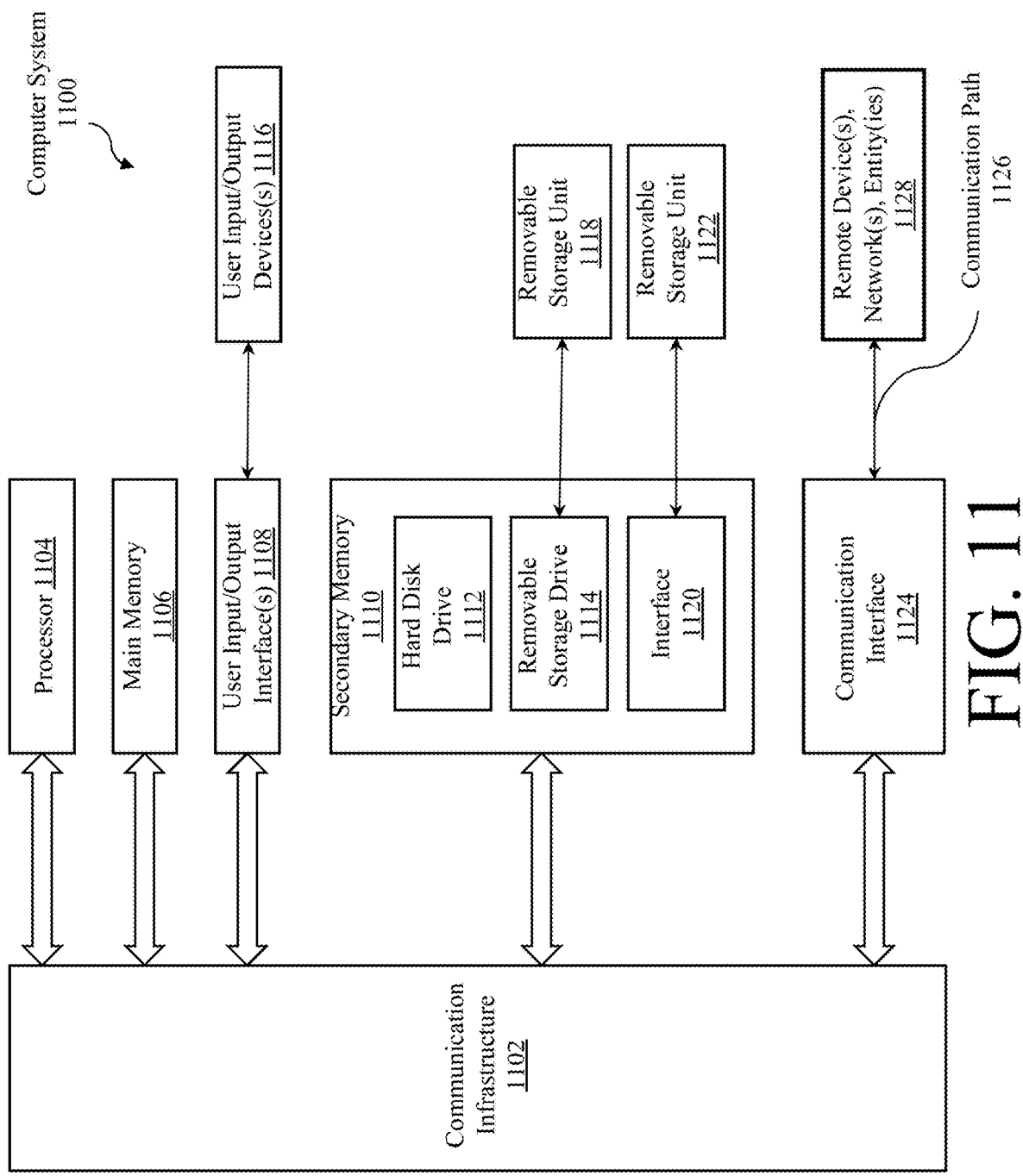
FIG. 11 is an illustration of an illustrative computing device.

Various embodiments can be implemented, for example, using one or more computer systems, such as computer system 1100 shown in FIG. 11. Computer system 1100 can be any computer capable of performing the functions described in this document.

Computer system 1100 includes one or more processors (also called central processing units, or CPUs), such as a processor 1104. Processor 1104 is connected to a communication infrastructure or bus 1102. Optionally, one or more of the processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1116, such as monitors, keyboards, pointing devices, etc., that communicate with communication infrastructure 1102 through user input/output interface(s) 1108.

Computer system 1100 also includes a main or primary memory 1106, such as random access memory (RAM). Main memory 1106 may include one or more levels of cache. Main memory 1106 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1114 reads from and/or writes to removable storage unit 1118 in a well-known manner.

According to an example embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1100, main memory 1106, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

Without excluding further possible embodiments, certain example embodiments are summarized in the following clauses.

Clause 1. A computer-implemented method for operating a radar system, comprising: obtaining, by a processor, radar scan data for a first scan performed by a first radar device of the radar system and radar scan data for a second scan performed by the first radar device or a second device of the radar system; identifying, by the processor, a detection pair comprising a first detection in the radar scan data for the first scan and a second detection in the radar scan data for the second scan; obtaining, by the processor, a 2D initial particle velocity using positions of the first and second detections of the detection pair; using, by the processor, the 2D initial particle velocity to obtain a projected range rate for the second detection of the detection pair; and creating, by the processor, a particle when the projected range rate matches a range rate associated with the second detection of the detection pair by a certain amount. The particle is assigned the 2D initial particle velocity and the position of the first detection of the detection pair.

Clause 2. The computer-implemented method of the preceding further comprising filtering the radar scan data for the first and second scans to remove detections outside a reachable region, remove detections that are associated with false alarms, or remove detections considered low radar cross-section (RCS) detections.

Clause 3. The computer-implemented method of any preceding clause further comprising enabling particle generation operations of the processor when a number of scans performed by the radar system exceeds a threshold.

Clause 4. The computer-implemented method of any preceding clause wherein the identifying a detection pair comprises using a search window defined by coordinates expressed in a range-azimuth reference frame.

Clause 5. The computer-implemented method of any preceding clause wherein the second detection of the pair comprises a range value falling between minimum and maximum ranges of the search window and an azimuth value falling between minimum and maximum azimuths of the search window.

Clause 6. The computer-implemented method of any preceding clause wherein the positions of the first and second detections of the detection pair are defined in relation to an XY reference frame.

Clause 7. The computer-implemented method of any preceding clause further comprising considering the particle a valid particle when a total number of matched detections exceeds a count threshold. Each matched detection may be associated with another scan performed by the radar system and have a position located inside a bounding box associated with the first detection of the detection pair.

Clause 8. The computer-implemented method of any preceding clause wherein the bounding box is defined by coordinates expressed in a range-azimuth reference frame, and the range and azimuth variances associated with the first detection of the detection pair are used to obtain the coordinates of the bounding box.

Clause 9. The computer-implemented method of any preceding clause further comprising refining the position and range rate of the particle using a least square algorithm.

Clause 10. The computer-implemented method of any preceding clause further comprising creating a radar perception grid using the particle.

Clause 11. The computer-implemented method of any preceding clause further comprising using the radar perception grid to control operations of an autonomous vehicle.

Clause 12. A system comprising means for performing steps of any of the above method clauses.

Clause 13. A computer program, or a storage medium storing the computer program, comprising instructions, which when executed by one or more suitable processors cause any of the processors to perform the steps of any of the above method clauses.

What is claimed is:

1. A method for operating a radar system, comprising:
obtaining, by a processor, radar scan data for a first scan performed by a first radar device of the radar system and radar scan data for a second scan performed by the first radar device or a second device of the radar system;
defining a search window using coordinates expressed in a range-azimuth reference frame, the range-azimuth reference frame being based on a time difference between the first scan and the second scan;
identifying, by the processor, a detection pair comprising a first detection in the radar scan data for the first scan and a second detection in the radar scan data for the second scan using the search window;
obtaining, by the processor, a 2D initial particle velocity using positions of the first and second detections of the detection pair;
using, by the processor, the 2D initial particle velocity to obtain a projected range rate for the second detection of the detection pair; and
creating, by the processor, a particle when the projected range rate matches a range rate associated with the second detection of the detection pair by a certain amount, wherein the particle is assigned the position of the first detection of the detection pair and the 2D initial particle velocity as a range rate.

2. The method according to claim 1, further comprising filtering the radar scan data for the first and second scans to remove detections outside a reachable region, remove detections that are associated with false alarms, or remove detections considered low radar cross-section detections.

3. The method according to claim 1, further comprising enabling particle generation operations of the processor when a number of scans performed by the radar system exceeds a threshold.

4. The method according to claim 1, wherein the second detection of the pair comprises a range value falling between minimum and maximum ranges of the search window and an azimuth value falling between minimum and maximum azimuths of the search window.

5. The method according to claim 1, wherein the positions of the first and second detections of the detection pair are defined in relation to an XY reference frame.

6. The method according to claim 1, further comprising considering the particle a valid particle when a total number of matched detections for the particle exceeds a count threshold, each matched detection being associated with a subsequent scan performed by the radar system and having a position located inside a bounding box associated with the first detection of the detection pair that matches an expected position for the particle, wherein the subsequent scan is after the first scan and the second scan.

7. The method according to claim 6, wherein the bounding box is defined by coordinates expressed in the range-azimuth reference frame, and the range and azimuth variances associated with the first detection of the detection pair are used to obtain the coordinates of the bounding box.

8. The method according to claim 1, further comprising refining the position and range rate of the particle using a least square algorithm.

9. The method according to claim 1, further comprising creating a radar perception grid using the particle.

10. The method according to claim 9, further comprising using the radar perception grid to control operations of an autonomous vehicle.

11. A system, comprising:
a processor; and
a non-transitory computer-readable storage medium comprising programming instructions that are configured to cause the processor to implement a method for operating a radar system, wherein the programming instructions comprise instructions to:
obtain radar scan data for a first scan performed by a first radar device of the radar system and radar scan data for a second scan performed by the first radar device or a second device of the radar system;
define a search window using coordinates expressed in a range-azimuth reference frame, the range-azimuth reference frame being based on a time difference between the first scan and the second scan;
identify a detection pair comprising a first detection in the radar scan data for the first scan and a second detection in the radar scan data for the second scan using the search window;
obtain a 2D initial particle velocity using positions of the first and second detections of the detection pair;
use the 2D initial particle velocity to obtain a projected range rate for the second detection of the detection pair; and
create a particle when the projected range rate matches a range rate associated with the second detection of the detection pair by a certain amount, wherein the particle is assigned the position of the first detection of the detection pair and the 2D initial particle velocity.

12. The system according to claim 11, wherein the programming instructions further comprise instructions to filter the radar scan data for the first and second scans to remove detections outside a reachable region, remove detections that are associated with false alarms, or remove detections considered low radar cross-section detections.

13. The system according to claim 11, wherein the programming instructions further comprise instructions to enable particle generation operations of the processor when a number of scans performed by the radar system exceeds a threshold.

14. The system according to claim 11, wherein the second detection of the pair comprises a range value falling between minimum and maximum ranges of the search window and an azimuth value falling between minimum and maximum azimuths of the search window.

15. The system according to claim 11, wherein the positions of the first and second detections of the detection pair are defined in relation to an XY reference frame.

16. The system according to claim 11, wherein the programming instructions further comprise instructions to consider the particle to be a valid particle when a total number of matched detections for the particle exceeds a count threshold, each matched detection being associated with a subsequent scan performed by the radar system and having a position located inside a bounding box associated with the first detection of the detection pair that matches an expected position for the particle, wherein the subsequent scan is after the first scan and the second scan.

17. The system according to claim 16, wherein the bounding box is defined by coordinates expressed in the range-azimuth reference frame, and the range and azimuth variances associated with the first detection of the detection pair are used to obtain the coordinates of the bounding box.

18. A non-transitory computer-readable medium that stores instructions that is configured to, when executed by at least one computing device, cause the at least one computing device to perform operations comprising:

obtaining radar scan data for a first scan performed by a first radar device of a radar system and radar scan data for a second scan performed by the first radar device or a second device of the radar system;

defining a search window using coordinates expressed in a range-azimuth reference frame, the range-azimuth reference frame being based on a time difference between the first scan and the second scan;

identifying a detection pair comprising a first detection in the radar scan data for the first scan and a second detection in the radar scan data for the second scan using the search window;

obtaining a 2D initial particle velocity using positions of the first and second detections of the detection pair;

using the 2D initial particle velocity to obtain a projected range rate for the second detection of the detection pair; and creating a particle when the projected range rate matches a range rate associated with the second detection of the detection pair by a certain amount, wherein the particle is assigned the position of the first detection of the detection pair and the 2D initial particle velocity.

* * * * *